United States Patent
Neri et al.

[11] Patent Number: 5,844,042
[45] Date of Patent: Dec. 1, 1998

[54] PROCESS FOR OBTAINING GRANULAR FORMS OF ADDITIVES FOR ORGANIC POLYMERS

[75] Inventors: Carlo Neri; Luciano Pallini, both of San Donato Milanese, Italy

[73] Assignee: Great Lakes Chemical Italia S.r.l., Milan, Italy

[21] Appl. No.: 937,899

[22] Filed: Sep. 25, 1997

Related U.S. Application Data

[63] Continuation of Ser. No. 43,349, Apr. 6, 1993, abandoned.
[51] Int. Cl.$^6$ .............................. C08K 7/16; C08K 5/09
[52] U.S. Cl. ........................... 523/223; 252/397; 524/291
[58] Field of Search ........................... 252/397; 523/223; 524/291

[56] References Cited

FOREIGN PATENT DOCUMENTS 0392392  10/1990  European Pat. Off. .

*Primary Examiner*—Kriellion S. Morgan
*Attorney, Agent, or Firm*—Kramer Levin Naftalis & Frankel; George P. Hoare, Jr.

[57] ABSTRACT

Process for obtaining granular forms, from mixtures of powders of two or more additives for organic polymers, including extruding the mixture at a temperature of between about the melting point of the component with the lowest melting point and 140° C., with the condition that, when the mixture consists of two additives, these are not tetrakis [3-(3,5-di-t-butyl-4-hydroxyphenyl) propionyloxymethyl] methane, either in an amorphous or crystalline form, and an antiacid.

5 Claims, No Drawings

PROCESS FOR OBTAINING GRANULAR FORMS OF ADDITIVES FOR ORGANIC POLYMERS

This application is a continuation of U.S. Ser. No. 08/043,349 filed Apr. 6, 1993 abandoned.

The present invention relates to a process for obtaining granular forms from mixtures of additive powders for organic polymers.

More specifically the present invention relates to a process for obtaining granular forms, from mixtures of powders of two or more additives for organic polymers, including extruding the mixture at a temperature of between about the melting point of the component with the lowest melting point and 140° C.

Organic polymers, and particularly polyolefins, during their processing need various types of additives as stabilizers for the oxidative degradation caused by light or heat, or antiacids which are suitable for neutralizing the acid residues coming, for example, from polymerization catalysts, etc.

Both oxidative degradation stabilizers and antiacids are normally in powder form.

When these powders are used in the processing of polymers, they have the disadvantage of being dispersed in the air and can be harmful to the health of the operators as well as creating safety problems due to the possibility of explosions.

Another disadvantage in using these additives in powder form is their tendency to pack up in the feeding hopper, consequently giving inconstant dosages of additives in the polymer.

In addition, the use of mixtures of additives in powder form in the stabilization of organic polymers, causes difficulties in obtaining a complete homogenization between the various components of the mixture and consequently between these and the organic polymer. This causes a non-homogeneous stabilization.

To avoid the above inconveniences, attempts have been made to granulate these additive powders, either alone or mixed with each other, in order to obtain formulates which can be easily handled and dosed.

For this purpose attempts have so far been made with granulation systems using dry compacting machines or pellet mills. These procedures however, in most cases, are not very effective in that granules are obtained with a low mechanical resistance and which are difficult to handle owing to their tendency to crumble.

As an alternative, binders such as waxes, paraffins, steramides etc. may be used. In this case, however, undesired compounds are introduced into the polymer.

It has now been found that it is possible to overcome the disadvantages of the processes of the known art by using a perfected process, whereby granular forms having improved properties of mechanical resistance are obtained without introducing undesired products into the stabilizing formulation.

The process of the invention also enables granules of the above stabilizing mixtures having a high degree of homogenization to be prepared.

The present invention consequently relates to a process for obtaining granular forms, from mixtures of powders of two or more additives for organic polymers, which includes extruding the mixture at a temperature of between about the melting point of the component having the lowest melting point and 140° C. with the condition that, when the mixture consists of two additives, these are not tetrakis[3-(3,5-di-t-butyl-4-hydroxyphenyl)propionyloxymethyl]methane, either in an amorphous or crystalline form, and an antiacid.

The mixture of powders used in the embodiment of the present invention is generally composed of at least two additives for organic polymers belonging to the following groups:

primary antioxidants such as sterically hindered phenols;
secondary antioxidants such as phosphites, phosphonites, thioesters;
organic or inorganic antacids;
light stabilizers such as ultra-violet ray absorbers and sterically hindered amines.

Primary antioxidants commonly used are sterically hindered phenols, such as tetrakis[3-(3,5-di-t-butyl-4hydroxyphenyl)propionyloxymethyl]methane both in an amorphous and crystalline form, octadecyl-3-(3',5'-di-t-butyl-4'-hydroxyphenyl)propionate, 1,3,5-tris(3,5-dit-butyl-4-hydroxybenzyl)isocyanurate and (1,3,5-trimethyl-2,4,6-tris(3,5-di-t-butyl-4-hydroxybenzyl)benzene).

As an amorphous tetrakis[3-(3,5-di-t-butyl-4-hydroxyphenyl)propionyloxymethyl]methane it is possible to use the product of EniChem Synthesis having the trade-name Anox 20 AM.

As a crystalline tetrakis[3-(3,5-di-t-butyl-4-hydroxyphenyl)propionyloxymethyl]methane it is possible to use, for example, the commercial product Anox 20 of EniChem Synthesis or Irganox 1010 of Ciba-Geigy.

An octadecyl-3-(3',5'-di-t-butyl-4'-hydroxyphenyl) propionate which can be used is, for example, the commercial product Anox PP18 of EniChem Synthesis or Irganox 1076 of Ciba-Geigy.

A 1,3,5-tris(3,5-di-t-butyl-4-hydroxybenzyl)isocyanurate which can be used is, for example, the commercial product Anox 1C-14 of EniChem Synthesis.

A (1,3,5-trimethyl-2,4,6-tris(3,5-di-t-butyl-4-hydroxybenzyl)benzene which can be used is, for example, Irganox 1330 of Ciba-Geigy.

Secondary antioxidants which are commonly used are tris(2,4-di-t-butyl-phenyl)phosphite, bis-(2,4-di-t-butyl-phenyl)-pentaerythrityl-diphosphite and tetrakis-(2,4-di-t-butyl-phenyl)-4,4'-biphenylylene-diphosphonite.

A tris(2,4-di-t-butyl-phenyl)phosphite which can be used, for example, is the commercial product Alkanox 240 of EniChem Synthesis or Irgafos 168 of Ciba-Geigy.

A bis-(2,4-di-t-butyl-phenyl)-pentaerythrityldiphosphite which can be used is Ultranox 626 of General Electric.

A tetrakis-(2,4-di-t-butyl-phenyl)-4,4'-biphenylylene-diphosphonite which can be used is Sandostab PEPQ of Sandoz.

Thioesters which are commonly used are dilaurylthiodipriopionate (DLTP) and distearylthiodipropionate (DSTP).

Antiacids commonly used are stearates, for example of calcium, zinc, magnesium or aluminium; oxides, such as zinc oxide or magnesium oxide or titanium bioxide; artificial or natural carbonates, such as calcium carbonate or hydrotalcite.

The above compounds are known and are available on the market. In particular for hydrotalcite, which is a compound having the formula $Mg_6Al_2(OH)_{16}(CO_3).4H_2O$, it is possible to use the product sold by Kyowa under the trade-name of DHT4A.

Light stabilizers commonly used are 2(2'-hydroxy-3'-t-butyl-5'-methylphenyl)-5-chlorobenzotriazole and 2-hydroxy-4-octyloxybenzophenone.

As a 2(2'-hydroxy-3'-t-butyl-5'methylphenyl)-5-chlorobenzotriazole it is possible to use the commercial product of EniChem Synthesis Uvazol 236 or Tinuvin 326 of Ciba-Geigy.

As a 2-hydroxy-4-octyloxybenzophenone Chimassorb 81 of Ciba-Geigy can be used.

Other light stabilizers commonly used are sterically hindered amines such as bis(2,2,6,6-tetramethyl-4-piperidyl) sebacate and poly-(N-β-hydroxyethyl)-2,2,6,6-tetramethyl-4-hydroxy-piperidyl-succinate.

As a bis(2,2,6,6-tetramethyl-4-piperidyl)sebacate the commercial product of EniChem Synthesis Uvaseb 770 or Tinuvin 770 of Ciba-Geigy can be used.

As a poly-(N-β-hydroxyethyl)-2,2,6,6-tetramethyl-4-hydroxy-piperidyl-succinate Tinuvin 622 of Ciba-Geigy can be used.

The powders of the above-mentioned additives can be mixed before being fed into the extruder, or they can be fed separately into the extruder.

The process of the present invention is carried out at a temperature of between about the melting point of the component with the lowest melting point and 140° C., generally between 40° C. and 140° C.

The granular forms obtained according to the process of the present invention have a satisfactory mechanical resistance. The small quantities of powders which can be formed as a result of mechanical stress, are however free flowing. The above products can consequently be homogeneously dosed into the polymer.

In addition, by suitably establishing the relative quantities of powders, granular forms containing the various additives in the desired quantities with a high degree of homogenization can be prepared.

An extremely homogeneous dosage of the above additives is therefore obtained in the polymer to be stabilized, thus avoiding the introduction of undesired products and operating without powders.

The degree of homogenization of the granular forms obtained according to the procedure of the present invention is established using known analysis techniques, such as for example, X-ray fluorescence, HPLC, gas chromatography, etc.

The following examples, which are purely illustrative, provide a better understanding of the possibilities of embodying the present invention, but do not limit it in any way.

EXAMPLE 1

134 g of Anox PP18 and 66 g of calcium stearate are charged into a planetary mixer for powders.

The homogenized mixture is fed into a BRABENDER laboratory extruder having a cochlea with a length of 475 mm, diameter of 19 mm, compression ratio of 1:4, which has the possibility of differential heating in four different zones of the cochlea. The mixture is extruded through a hole having a diameter of 2.5 mm, with a rotation rate of the cochlea of 60 rpm and temperature profile of 50° C., 50° C., 49° C., 49° C.

A "spaghetto" is obtained which, when it has been cooled to room temperature, is then cut into pieces to obtain pellets having dimensions of about 2–2.5 mm.

Upon analyses, the pellets appear to be homogeneously composed of Anox PP18 and calcium stearate.

The product is without powders.

EXAMPLE 2

28.6 g of Anox PP18, 57.2 g of Alkanox 240 and 114.2 g of calcium stearate are charged into the powder mixer of example 1.

The homogenized mixture is treated as in example 1, with the only difference that the temperature profile in the extruder is constant at 95° C.

A powderless product is obtained with a homogeneous composition.

To determine the mechanical properties of the pellets thus obtained, tests of shattering resistance were carried out.

A PULVERISETTE powder-sieving machine of FRITSCH (WG), was used with five sieves having decreasing pore diameters from top to bottom of 2.80, 1.70, 1.00, 0.50 and 0.18 mm, and equipped with a lid and collecting tray.

The machine carries out the sieving operation by causing the column of sieves to vibrate. The range of vertical vibration is 1.6 mm.

To create an impact on the pellets during the sieving, glass marbles having a diameter of 17.3 mm and an average weight of 6.5 g were placed on the first four sieves. The number of marbles in the sieves is the following: 11 marbles in the first (2.80 mm), 10 marbles in the second (1.70 mm), 9 marbles in the third (1.00 mm) and 8 marbles in the fourth (0.50 mm).

100 g of product are dry-sieved for 5 minutes without the glass marbles to determine the initial particle-size distribution. The marbles are then placed in the sieves which, after re-weighing, are placed in the vibrating sieving-machine.

Two series of weighing were carried out after 10 and 20 minutes of sieving, thus determining the particle size distributions shown in Table 1.

As a comparison, pellets with the above additives were prepared using the traditional techniques. After the mechanical resistance test the pellets were totally pulverized.

EXAMPLE 3

60 g of Anox PP18 and 140 g of zinc stearate are charged into the powder mixer of example 1.

The homogenized mixture is treated as in example 1, with the only difference that the temperature profile in the extruder is constant at 90° C.

A powderless product is obtained with a homogeneous composition.

EXAMPLE 4

72.6 g of Anox 20, 18.2 g of Alkanox 240, 36.4 g of calcium stearate, 36.4 g of Uvaseb 770 and 36.4 g of Chimassorb 81 are charged into the powder mixer of example 1.

The homogenized mixture is treated as in example 1, with the only difference that the temperature profile in the extruder is constant at 45° C.

A powderless product is obtained with a homogeneous composition.

EXAMPLE 5

26 g of Anox 20, 26 g of Alkanox 240, 22 g of calcium stearate, 22 g of hydrotalcite and 104 g of Uvaseb 770 are charged into the powder mixer of example 1.

The homogenized mixture is treated as in example 1, with the only difference that the temperature profile in the extruder is constant at 70° C.

A powderless product is obtained with a homogeneous composition.

EXAMPLE 6

26.4 g of Anox 20, 53.6 g of Alkanox 240, 80 g of Tinuvin 622 and 40 g of Uvazol 236 are charged into the powder mixer of example 1.

The homogenized mixture is treated as in example 1, with the only difference that the temperature profile in the extruder is constant at 85° C.

A powderless product is obtained with a homogeneous composition.

EXAMPLE 7

20 g of Anox 20, 90 g of Alkanox 240 and 90 g of calcium stearate are charged into the powder mixer of example 1.

The homogenized mixture is treated as in example 1, with the only difference that the temperature profile in the extruder is 100° C., 120° C., 130° C., 120° C.

A powderless product is obtained with a homogeneous composition.

EXAMPLE 8

50 g of Anox 20, 50 g of Alkanox 240, 50 g of calcium stearate and 50 g of hydrotalcite are charged into the powder mixer of example 1.

The homogenized mixture is treated as in example 1, with the only difference that the temperature profile in the extruder is constant at 100° C.

A powderless product is obtained with a homogeneous composition.

To determine the mechanical properties of the pellets thus obtained, tests of shattering resistance were carried out using the same procedure described in example 2.

The particle size distributions of the product obtained are shown in Table 2.

EXAMPLE 9

Using a planetary mixer for powders a sample of commercial polypropylene of the type MOPLEN FLF20 is prepared to which 0.2% by weight of a mixture of Anox 20, Alkanox 240 powders and calcium stearate, similar to the one used in example 7, is added.

Using the same procedure a sample of the same polymer is prepared to which 0.2% by weight of the pellets obtained in example 7, previously crushed, are added.

The samples thus obtained are subjected to multiple extrusion using a laboratory BRABENDER with a screw rotation rate of 50 rpm and temperature profile of 190° C., 235° C., 270° C., 270° C.

Table 3 shows the melt flow index (MFI) and yellow index (YI) of the two polymer samples measured at the first, third and fifth extrusion.

It can be observed that the granulation of the additives using the process of the invention has substantially no influence on their performance.

TABLE 1

| mm | Initial | 10' with marbles | 20' with marbles |
|---|---|---|---|
| >2.8 | 2.6% | 0.4% | — |
| 1.7 ÷ 2.8 | 57.2% | 31.7% | 16.2% |
| 1.0 ÷ 1.7 | 31.2% | 34.0% | 24.7% |
| 0.5 ÷ 1.0 | 7.5% | 23.1% | 35.3% |
| 0.18 ÷ 0.5 | 1.1% | 8.9% | 19.0% |
| <0.18 | 0.4% | 1.9% | 4.8% |

TABLE 2

| mm | Initial | 10' with marbles | 20' with marbles |
|---|---|---|---|
| >2.8 | 2.0% | 0.2% | — |
| 1.7 ÷ 2.8 | 62.3% | 29.3% | 14.0% |
| 1.0 ÷ 1.7 | 31.7% | 33.5% | 12.9% |
| 0.5 ÷ 1.0 | 2.5% | 21.7% | 43.2% |
| 0.18 ÷ 0.5 | 1.3% | 13.0% | 24.8% |
| <0.18 | 0.2% | 2.3% | 5.1% |

TABLE 3

|  | Granules | Powders |
|---|---|---|
| MFI - 1 st. | 14.0 | 13.8 |
| MFI - 3 rd. | 16.5 | 16.5 |
| MFI - 5 th. | 19.2 | 19.2 |
| YI - 1 st. | −3.2 | −2.9 |
| YI - 3 rd. | −1.0 | −0.8 |
| YI - 5 th. | 0.0 | 0.5 |

We claim:

1. Process for obtaining pelletized forms, from powder mixtures of two or more additives for organic polymers in the absence of binders, which includes extruding the mixture at a temperature of between the melting point of the component with the lowest melting point and 140° C., with the condition that the extrusion temperature is below the melting point of at least one of the two or more additives and with the condition that, when the mixture consists of two additives, these are not tetrakis [3-(3,5-di-t-butyl-4-hydroxyphenyl)propionyl oxymethyl]methane, either in an amorphous or crystalline form, and an antacid.

2. Process according to claim 1, wherein the mixture of powders used in the embodiment of the present invention is generally composed of at least two additives for organic polymers belonging to the following groups:

primary antioxidants such as sterically hindered phenols;

secondary antioxidants such as phosphites, phosphonites, thioesters;

organic or inorganic antacids;

light stabilizers such as ultra-violet ray absorbers and sterically hindered amines.

3. Process according to claim 1, wherein the temperature is between 40° C. and 140° C.

4. A method of stabilizing organic polymers, said process comprising adding to the organic polymer an additive prepared according to the process of claim 1.

5. Process for obtaining pelletized forms, from mixtures of two or more additives for organic polymers in the absence of binders, which includes extruding the mixture at a temperature of between the melting point of the component with the lowest melting point and 140° C., cooling the extrudate to room temperature and cutting the extrudate into pellets, with the condition that, when the mixture consists of two additives these are not tetrakis[3-(3,5-di-t-butyl-4-hydroxyphenyl)propionyloxymethyl]methane, either in amorphous or crystalline form, and an antacid.

* * * * *